United States Patent
McIver et al.

(10) Patent No.: US 10,293,956 B2
(45) Date of Patent: May 21, 2019

(54) METHOD FOR PLACING ELECTRICAL CONDUCTORS INTERIOR TO A COMPOSITE STRUCTURE PRIOR TO CURING

(71) Applicant: The Boeing Company, Chicago, IL (US)

(72) Inventors: Carl Roy McIver, Everett, WA (US); Dejan Nikic, Seattle, WA (US); Arthur C. Day, Seattle, WA (US)

(73) Assignee: The Boeing Company, Chicago, IL (US)

( * ) Notice: Subject to any disclaimer, the term of this patent is extended or adjusted under 35 U.S.C. 154(b) by 260 days.

(21) Appl. No.: 15/268,357

(22) Filed: Sep. 16, 2016

(65) Prior Publication Data
US 2018/0079526 A1   Mar. 22, 2018

(51) Int. Cl.
*B64D 45/02* (2006.01)
*B29C 70/88* (2006.01)

(52) U.S. Cl.
CPC ............ *B64D 45/02* (2013.01); *B29C 70/882* (2013.01)

(58) Field of Classification Search
CPC .............................. B64D 45/02; B29C 70/882
See application file for complete search history.

(56) References Cited

U.S. PATENT DOCUMENTS

| 4,983,456 A | * | 1/1991 | Iwaskow | H01B 1/22 |
| | | | | 428/367 |
| 6,000,977 A | | 12/1999 | Haake | |
| 6,137,083 A | | 10/2000 | Bost et al. | |
| 6,868,314 B1 | | 3/2005 | Frink | |
| 7,391,622 B2 | | 6/2008 | Marshall et al. | |
| 2007/0154634 A1 | | 7/2007 | Renn | |
| 2007/0230085 A1 | * | 10/2007 | Le | B64D 45/02 |
| | | | | 361/212 |
| 2010/0151214 A1 | | 6/2010 | Cawse | |
| 2012/0111614 A1 | | 5/2012 | Free | |

FOREIGN PATENT DOCUMENTS

WO   9511129   4/1995

OTHER PUBLICATIONS

Extended European Search Report dated Feb. 16, 2018 for European Patent Application No. 17185102.5.
(Continued)

*Primary Examiner* — Scott Bauer
(74) *Attorney, Agent, or Firm* — Gates & Cooper LLP

(57) ABSTRACT

A method for placing electrical conductors interior to a composite structure prior to curing. A laminate stack is formed by assembling one or more composite layers, wherein the composite layers are pre-impregnated with a resin. One or more electrical conductors are placed on at least one of the composite layers prior to curing the laminate stack. One or more electrical insulators is optionally placed in proximity to one or more of the electrical conductors in at least one of the composite layers prior to curing the laminate stack. The laminate stack, including the composite layers, the electrical conductors, and the electrical insulators, is then cured to create the composite structure.

40 Claims, 6 Drawing Sheets

(56) References Cited

OTHER PUBLICATIONS

Mulazimoglu, H., et al., "Recent Developments in Techniques to Minimize Lightning Current Arcing Between Fasteners and Composite Structure", International Conference on Lightning and Static Electricity, 2011 . https://www.alcoa.com/fastening_systems_and_rings/aerospace/en/pdf/hasim_icosle_2011.pdf.

Yoon, S. H., et al., "Sintering and Consolidation of Silver Nanoparticles Printed on Polyimide Substrate Films", Macromolecular Research, vol. 17, No. 8, pp. 568-574, 2009.

Novacentrix Metalon HPS-DEV ink, last accessed May 17, 2016. http://store.novacentrix.com/HPS_021LV_silver_screen_print_ink_p/hps-dev.htm.

Schroder, K. A., et al., "Broadcast Photonic Curing of Metallic Nanoparticle Films", NSTI-Nanotech 2006, vol. 3, 2006. http://www.novacentrix.com/sites/default/files/pdf/Schroder-NSTI-2006.pdf.

Schroder, K. A., "Mechanisms of Photonic Curing: Processing High Temperature Films on Low Temperature Substrates", last accessed Sep. 16, 2016. http://www.novacentrix.com/sites/default/files/pdf/Schroder-NSTI-2011.pdf.

Perelaer J., et al., "Ink jet Printing and Microwave Sintering of Conductive Silver Tracks", Adv. Mater. Jul. 2006, 18, pp. 2101-2104. https://www.researchgate.net/publication/228031694_Ink-Jet_Printing_and_Microwave_Sintering_of_Conductive_Silver_Tracks.

Luo, S., et al., "Effect of UV/Ozone Treatment on Surface Tension and Adhesion in Electronic Packaging", IEEE Transactions on Components and Packaging Technologies, vol. 24, No. 1, pp. 43-49, Mar. 2001.

West, J., et al., "Photonic Sintering of Silver Nanoparticles: Comparison of Experiment and Theory", from the book titled "Sintering—Methods and Products", (2012), ISBN: 978-953-51-0371-4, InTech. http://cdn.intechopen.com/pdfs/33167/InTech-Photonic_sintering_of_silver_nanoparticles_comparison_of_experiment_and_theory.pdf.

Hwang, H., et al., "All-photonic drying and sintering process via flash white light combined with deep-UV and near-infrared irradiation for highly conductive copper nano-ink", Scientific Reports 6, Article No. 19696 (2016).

\* cited by examiner

METHOD FOR PLACING ELECTRICAL CONDUCTORS INTERIOR TO A COMPOSITE STRUCTURE PRIOR TO CURING

CROSS REFERENCE TO RELATED APPLICATION

This application is related to the following co-pending and commonly-assigned application:

U.S. Utility application Ser. No. 15/268,339, filed on Sep. 16, 2016, by Arthur C. Day, Carl R. McIver and Dejan Nikic, entitled "METHOD FOR PROMOTING ELECTRICAL CONDUCTION BETWEEN METALLIC COMPONENTS AND COMPOSITE MATERIALS";

which application is incorporated by reference herein.

BACKGROUND INFORMATION

1. Field

The invention is related generally to a method for placing electrical conductors interior to a composite structure prior to curing.

2. Background

Lightning protection, electromagnetic effects (EME) management, and grounding systems are used in aircraft to prevent arcing or sparking in or near fuel tanks, and electrical damage to other components of the aircraft. Such systems not only dissipate lightning strikes, they provide for electrical shielding, grounding and surge suppression.

In the past, most aircraft were comprised of aluminum, which conducts electricity very well. However, modern aircraft use advanced composite materials, such as carbon fiber-reinforced polymers (CFRPs), which are much less conductive. Consequently, conductive paths must be designed for use with such materials to carry electrical currents.

Existing methods of conventional wiring with composite materials require significant materials, weight, and labor to install, service, and maintain electrical conductors and systems. For example, expanded copper foil (ECF) for lightning protection is installed in roll form, and conducts well within a given foil strip, but conduction to adjacent foil strips is limited.

It is desirable that any solutions to these problems with composite materials be provided at a low cost and with a low weight impact. It would be preferable to use materials that can be fabricated during the lamination process with composite materials.

Conductive paints have been proposed in the past as a way to improve the electrical conductivity for external surfaces of composite structures. However, past attempts to use particle-laden paints have been unsuccessful, due to their modest conductivity and difficulties in their application.

Another solution that has been proposed is the use of liquid metals (i.e., liquid at or near room temperature) to fill spaces in the composite materials. However, liquid metals tend to form brittle intermetallic compounds with titanium and other structural metals used with composite structures, which could severely degrade the mechanical properties of the structural metals.

What is needed, then, is a solution that promotes electrical conduction within composite materials.

SUMMARY

To overcome the limitations in the prior art described above, and to overcome other limitations that will become apparent upon reading and understanding the present specification, the present invention discloses a method, apparatus and article of manufacture for placing electrical conductors interior to a composite structure prior to curing. A laminate stack is formed by assembling one or more composite layers, wherein the composite layers are pre-impregnated with a resin. One or more electrical conductors are placed on at least one of the composite layers prior to curing the laminate stack. One or more electrical insulators are optionally placed in proximity to one or more of the electrical conductors in at least one of the composite layers prior to curing the laminate stack. The laminate stack, including the composite layers, the electrical conductors, and the electrical insulators, is then cured to create the composite structure.

DRAWINGS

Referring now to the drawings in which like reference numbers represent corresponding parts throughout:

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

In one embodiment, a method for placing electrical conductors, and optionally insulators, interior to a composite structure prior to curing provides for the creation of circuit trace patterns within or on the composite structure.

The conductors and insulators are deposited as layers during the composite structure layup processes. Individual conductors and insulators are deposited in a predetermined manner onto a surface of one or more uncured composite layers pre-impregnated with a resin, as the composite structure is being assembled, preferably using automated methods, and before the composite structure is cured.

The conductors are conducting layers, and may be placed on different ones of the composite layers of the composite structure. Conductors also may be deposited in such a way as to provide a conductive path between the layers. Moreover, one layer may be electrically bonded to or insulated from another layer.

The insulators are insulating layers, and may be placed on different ones of the composite layers of the composite structure adjacent to the conducting layers. Insulators also may be deposited in such a way as to provide an insulating path between the layers. Moreover, one layer may be selectively electrically insulated from another layer.

The conductors can be placed as needed to direct current in specific directions. Moreover, the conductors can be deposited with different thicknesses for different current densities. The placement of conductors can also be used as a replacement for or to repair damage to lightning protection, EME management systems or grounding systems.

During the composite structure curing process, the final electrical properties of the conductors will be realized. The conductors may or may not have electrical insulating materials or coatings deposited along with the conductors.

This method eliminates the need for distinct conductors, insulators, wiring, wiring supports, feedthroughs, and related materials and processes, in order to pass electrical current and signals to pass along or through composite structures. It also allows for direct application of conductors to replace or enhance existing lightning protection, EME management or grounding systems.

This method results in considerable weight savings and considerable labor savings. It allows for the conversion of existing wiring installation methods to more automated and less expensive fabrication methods such as robotic methods.

Structure Description

Figure 1:
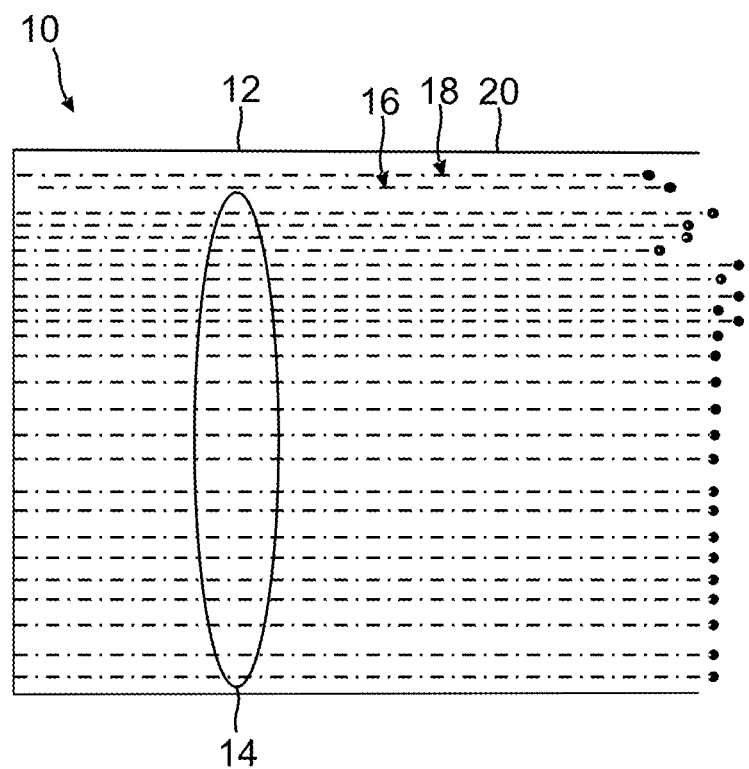
FIG. 1 is a cross-sectional view illustrating a composite structure, according to one embodiment.

FIG. 1 is a cross-sectional view illustrating a composite structure 10 comprised of composite materials such as CFRPs, according to one embodiment. The composite structure 10 is fabricated using a layup process, which typically comprises forming a laminate stack 12 by assembling one or more composite layers 14, wherein the composite layers 14 are pre-impregnated with a resin, and then curing the laminate stack 12 using heat, light and/or pressure to create the composite structure 10.

In one embodiment, one or more electrical conductors 16 are selectively placed on at least one of the composite layers 14 during assembly and prior to curing, and then one or more additional composite layers 14 are laid on at least one of the electrical conductors 16, also during assembly and prior to curing. Optionally, one or more electrical insulators 18 are placed in proximity to one or more of the conductors 16 in at least one of the composite layers 14 prior to curing the laminate stack 12. In another embodiment, at least one of the electrical conductors 16 or electrical insulators 18 is deposited on at least a portion of a surface layer 20, which is also a composite layer 14, during assembly and prior to curing.

In both embodiments, the electrical conductors 16 and electrical insulators 18 are deposited on uncured composite layers 14. Thereafter, the laminate stack 12, including the composite layers 14, the electrical conductors 16 and the electrical insulators 18, is cured to create the composite structure 10. The end result is that the electrical conductors 16 and the electrical insulators 18 are interior to the composite structure 10 and/or at least one of the electrical conductors 16 or electrical insulators 18 is placed on at least a portion of the surface layer 20 of the composite structure 10.

Each of the electrical conductors 16 comprises one or more layers of electrically conductive material, such as an ink or paint that is loaded with a plurality of conducting particles. These conducting particles will typically be nanoparticles or microparticles, such as copper (Cu) or silver (Ag), embedded in, or in solution with, a carrier, such as a grease, epoxy, resin, solvent, or other material, that also may include low-temperature sintering agents. The particles' size enables sintering at a temperature used to cure the laminate stack 12, as well as allowing the ink to penetrate into the composite layers 14.

Each of the electrical insulators 18 comprises one or more layers of electrically insulating material, such as plastics, ceramics, or epoxy type materials. The insulating layers are printed in the vicinity of the electrical conductors 16 to prevent undesired current flow. Moreover, without the electrical insulator 18, the ink could migrate into other layers, creating unintended electrical connections. Although the electrical insulators 18 are shown as being on or above the electrical conductors 16, they may be below the electrical conductors 16 or on the same plane as the electrical conductors 16.

Compositions for use as the electrical conductor 16 include commercially available inks or paints for printed electronics that can be applied by several processes, including ink-jet printing. Experiments have included both GC Electronics Silver Print II™, a 60% microparticle silver/resin paint, and Novacentrix Metalon HPS-DEV™, a 90% nanoparticle silver ink. For purposes of comparison, the microparticle silver/resin paint has a typical resistivity of 10e-3 ohm-cm, while the nanoparticle silver ink has a typical resistivity of generally 10e-5 ohm-cm or better, in their deposited and sintered or cured forms. Experimental results indicate that the nanoparticle silver ink was more satisfactory than the microparticle silver/resin paint.

After application, microparticle paints typically do not require a curing step, other than time. However, nanoparticle inks typically require both drying and curing steps, where the inks are dried for a period immediately after their application and prior to the curing of the laminate stack 12, which drives off any non-silver products, such as stabilizers, carrier agents or surface oxides.

Curing is defined as the temperature and time environment sufficient to cure the laminate stack 12, and may or may not be sufficient to sinter the metallic constituents of the electrical conductors 16. The curing step is where the metallic particles of the electrical conductors 16 are joined to themselves and bond with the composite layers 14. The curing step can entail at least one of baking, induction heating, laser heating, flash radiant heating, or other similar method, and either under pressure or not under pressure.

Most curing steps of conductive materials require temperatures that would damage the carbon/epoxy in the composite structure 10, but the electrical conductors 16 in this embodiment can be processed at low temperatures between about 100° C. and about 200° C. to yield a highly conductive material without damaging the composite structure 10. (Many CFRP systems in common use have an epoxy resin matrix which is not stable at temperatures much above a cure temperature of 177° C.)

Consequently, the electrical conductors 16 and electrical insulators 18 applied to uncured composite layers 14 during the layup process cure at the same time and temperature as the laminate stack 12. This allows for electrical conductors 16 to be placed in locations within the composite structure 10 suitable for transmission of power, electrical signals, or lightning protection, EME management, and grounding systems. In contrast, electrical conductors deposited on an already-cured composite structure 10 typically are applied only to exposed external surfaces of the composite structure 10.

Moreover, the electrical insulators 18 can be selectively applied to allow electrical connection of the electrical conductors 16 to the composite layers 14, other layers of conductors 16, and other features or components in or on the laminate stack 12.

The end result enables high conductivity for the electrical conductors 16, without damaging the composite structure 10. In one embodiment, the composite structure 10 is a structure of an aircraft or other vehicle, and the electrical conductors 16 are a mesh or other electrically conducting structure underneath the surface layer 20 of the composite structure 10, e.g., an outside surface, while an opposite surface of the composite structure 10, e.g., an inside surface, is a surface of, or a surface adjacent to, a fuel tank (not shown).

Coating Description

Figure 2:
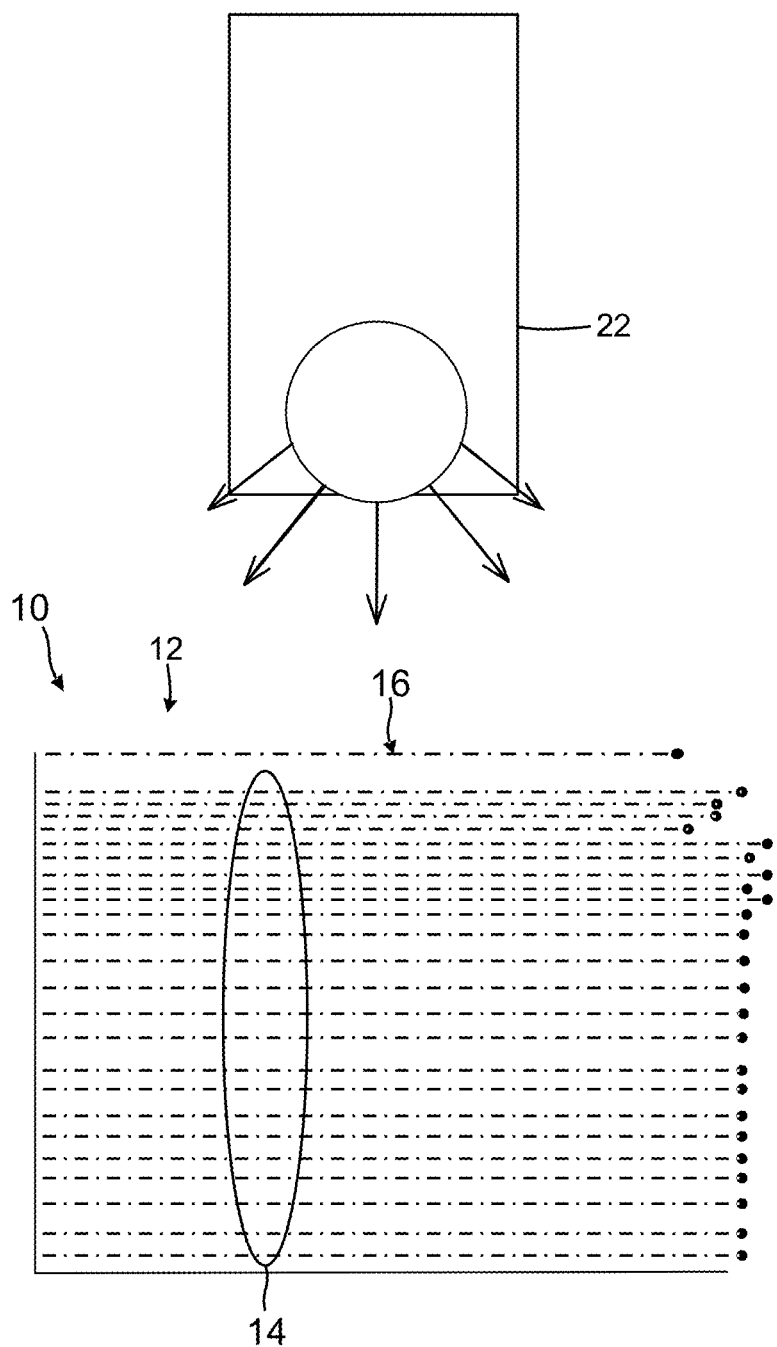
FIG. 2 is a cross-sectional view illustrating how a conductive layer is applied to a composite structure, according to one embodiment.

FIG. 2 is a cross-sectional view illustrating how the electrical conductors 16 are applied to the composite layer 14, according to one embodiment. In this embodiment, an applicator 22, such as an ink-jet printer, is used to deposit the electrical conductor 16 on the composite layer 14, although other applicators may be used as well. In one example, a silver nanoparticle ink formulation is placed within a reservoir of the applicator 22, which then applies the electrical conductors 16 as a conductor trace pattern in a predetermined manner onto a surface of an uncured composite layer 14 pre-impregnated with resin, preferably during an automated assembly. The applicator 22 may also be used to deposit the electrical insulators 18 (not shown) in the same manner, as well as the electrical conductors 16 or electrical insulators 18 on the surface layer 20 (not shown).

Note that the pattern, shape, size, or thickness of the electrical conductors 16 and electrical insulators 18 are dependent upon the electrical requirements of a particular application. However, the electrical conductors 16 and electrical insulators 18 could have encompass any pattern, shape, size or thickness required, such as straight lines (for power, ground, etc.) and patches (for holes). For example, patches may be placed where fastener holes are drilled in the composite structure 10, so that the holes would contain layers of conducting and/or insulating material after the drilling is complete. Also, in one embodiment, the electrical conductors 16 and electrical insulators 18 have a thickness of about 0.5-1 mil, which is typically less than a thickness of the composite layer 14, which is typically about 7 mil.

Curing Description

Figure 3:
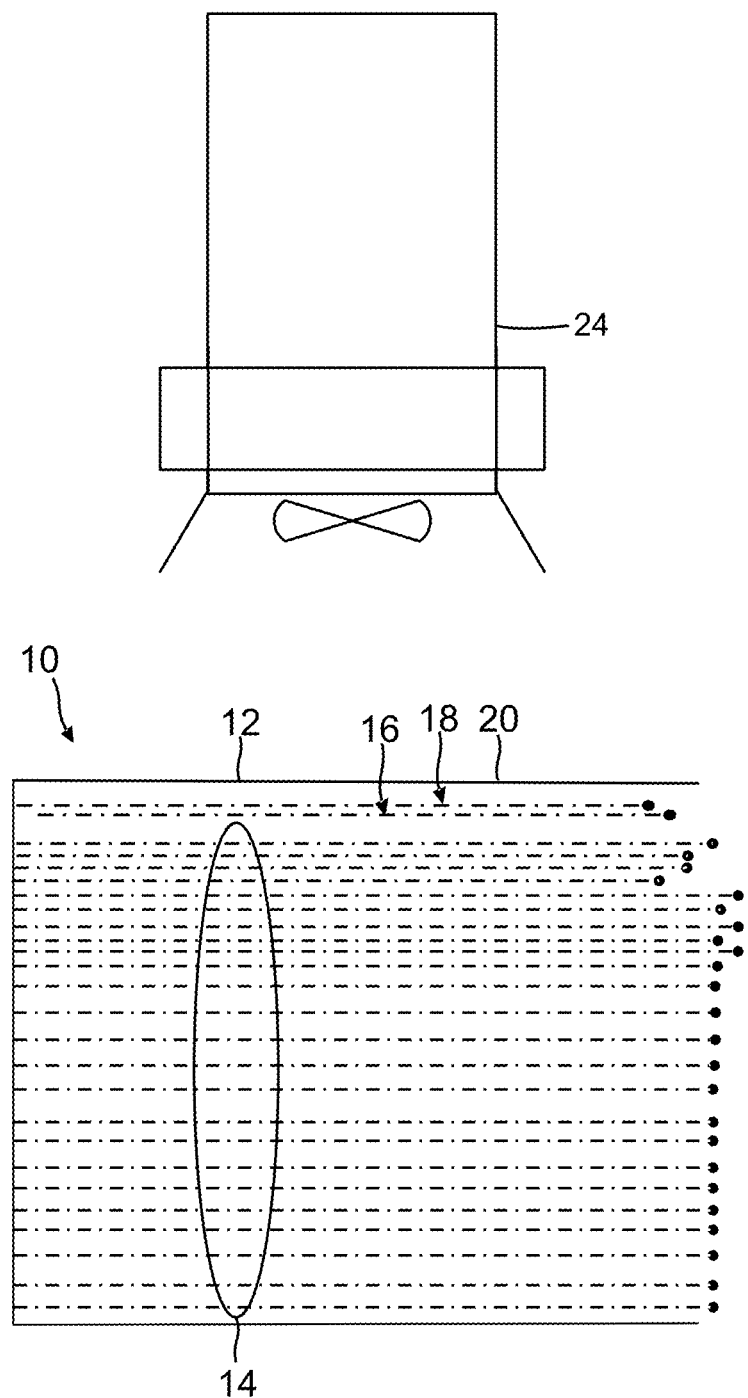
FIG. 3 is a cross-sectional view illustrating how the composite structure is cured, according to one embodiment.

FIG. 3 is a cross-sectional view illustrating how the laminate stack 12, including the composite layers 14, the electrical conductors 16 and the electrical insulators 18, is cured to create the composite structure 10, according to one embodiment. In this embodiment, a curing device 24, which is a thermal and pressure application source such as an autoclave, is used to cure the laminate stack 12, including the composite layers 14, the electrical conductors 16 and the electrical insulators 18, although other curing devices may be used as well. The curing device 24 may also be used to cure the electrical conductors 16 or electrical insulators 18 on the surface layer 20. The time to cure the laminate stack 12 may be determined by either the resin or the ink, depending on the particular ink applied to the laminate stack 12.

Fabrication Process Description

Figure 4:
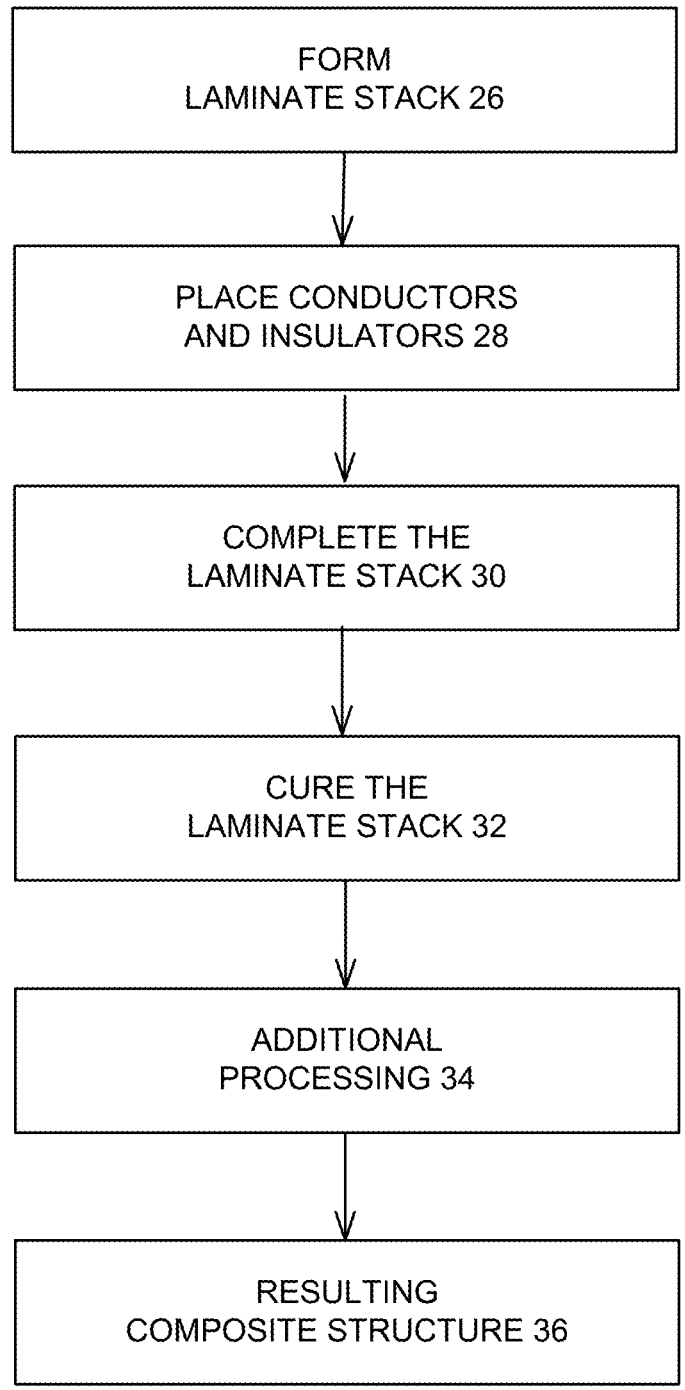
FIG. 4 is a flowchart illustrating a fabrication process, according to one embodiment.

FIG. 4 is a flowchart illustrating a fabrication process according to one embodiment.

Block 26 represents the step of forming a laminate stack 12 by assembling one or more composite layers 14, wherein the composite layers 14 are pre-impregnated with a resin. Note that various steps may be performed in or prior to this step.

Block 28 represents the step of placing or applying one or more electrical conductors 16 and electrical insulators 18 on at least one of the composite layers 14, by selectively depositing the electrical conductors 16 and electrical insulators 18 on the composite layers 14, or by selectively depositing one or more of the electrical conductors 16 or electrical insulators 18 on at least a portion of the surface layer 20. Any suitable material transfer method could be used for this step, including ink-jet printing, screen-printing, intaglio, dry film transfer, metallization, plating, and others.

Block 30 represents an optional step of completing the assembly of the laminate stack 12, when the laminate stack 12 is only partially formed prior to Block 28, such that the laminate stack 12 is fully formed in this step. Specifically, this Block includes selectively placing one or more additional composite layers 14 on the electrical conductors 16 and electrical insulators 18, prior to curing. Moreover, Blocks 28 and 30 may be repeated as desired to complete the assembly of the laminate stack 12.

Block 32 represents the step of performing in-situ curing of the laminate stack 12, including the composite layers 14, the electrical conductors 16 and the electrical insulators 18, to create the composite structure 10. The curing step is performed at a temperature and pressure determined by the composition of the composite layers 14, the electrical conductors 16 and the electrical insulators 18, as well as the interaction of the composite layers 14, the electrical conductors 16 and the electrical insulators 18. For example, curing may compact the metallic nanoparticles of the electrical conductors 16, as well as solidifying and hardening the composite layers 14, the electrical conductors 16, and the electrical insulators 18, using heat, light and/or pressure.

Block 34 represents the step of additional processing, if any. For example, if additional fabrication of the composite structure 10 is required after curing, appropriate tools are employed as necessary.

Block 36 represents the resulting composite structure 10 including the composite layers 14, the electrical conductors 16 and the electrical insulators 18, wherein the electrical conductors 16 and the electrical insulators 18 are interior to the composite structure 10 and/or on the surface 20 of the composite structure 10.

The above process steps may be used for any number of different applications or treatments. For example, these applications or treatments may include the following:

The deposition of an electrical conductor 16 or electrical insulator 18 in holes, vias or other structural elements of the composite structure 10 for electrically conducting or insulating purposes, such as lightning protection, EME management and grounding systems.

The deposition of an electrical conductor 16 or electrical insulator 18 in holes, vias or other structural elements of the composite structure 10 for structural purposes (which may be combined with the electrical purposes).

Repair applications or treatments could comprise replacement or repair of any of the above applications or treatments, as well as electrical repair of the lightning protection mesh established by the electrical conductors 16.

Examples of Aircraft and Methods of Fabricating and Operating Aircraft

Figure 5:
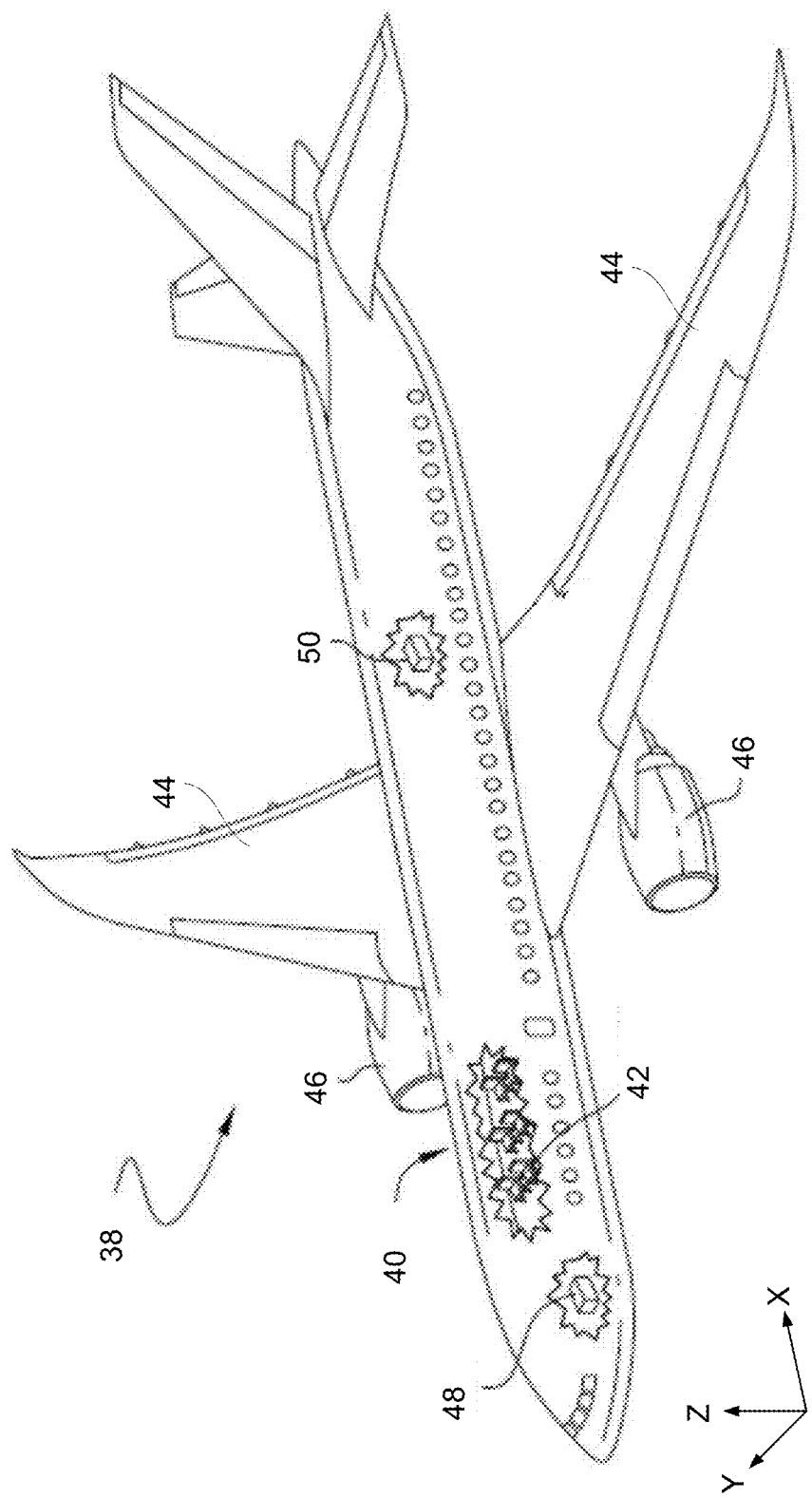
FIG. 5 is a schematic illustration of aircraft, in accordance with some embodiments.

To better understand various aspects of implementation of the described systems and techniques, a brief description of an aircraft and aircraft wing is now presented. FIG. 5 is a schematic illustration of aircraft 38, in accordance with some embodiments. As depicted in FIG. 5, aircraft 38 is defined by a longitudinal axis (X-axis), a lateral axis (Y-axis), and a vertical axis (Z-axis). In various embodiments, aircraft 38 comprises airframe 40 with interior 42. Aircraft 38 includes wings 44 coupled to airframe 40. Aircraft 38 may also include engines 46 supported by wings 44. In some embodiments, aircraft 38 further includes a number of high-level systems such as electrical system 48 and environmental system 50. In other embodiments, any number of other systems may be included.

Although an aerospace example is shown, the principles disclosed herein may be applied to other industries, such as the automotive industry. Accordingly, in addition to aircraft 38, the principles disclosed herein may apply to other vehicles, e.g., land vehicles, marine vehicles, space vehicles, etc.

Figure 6:
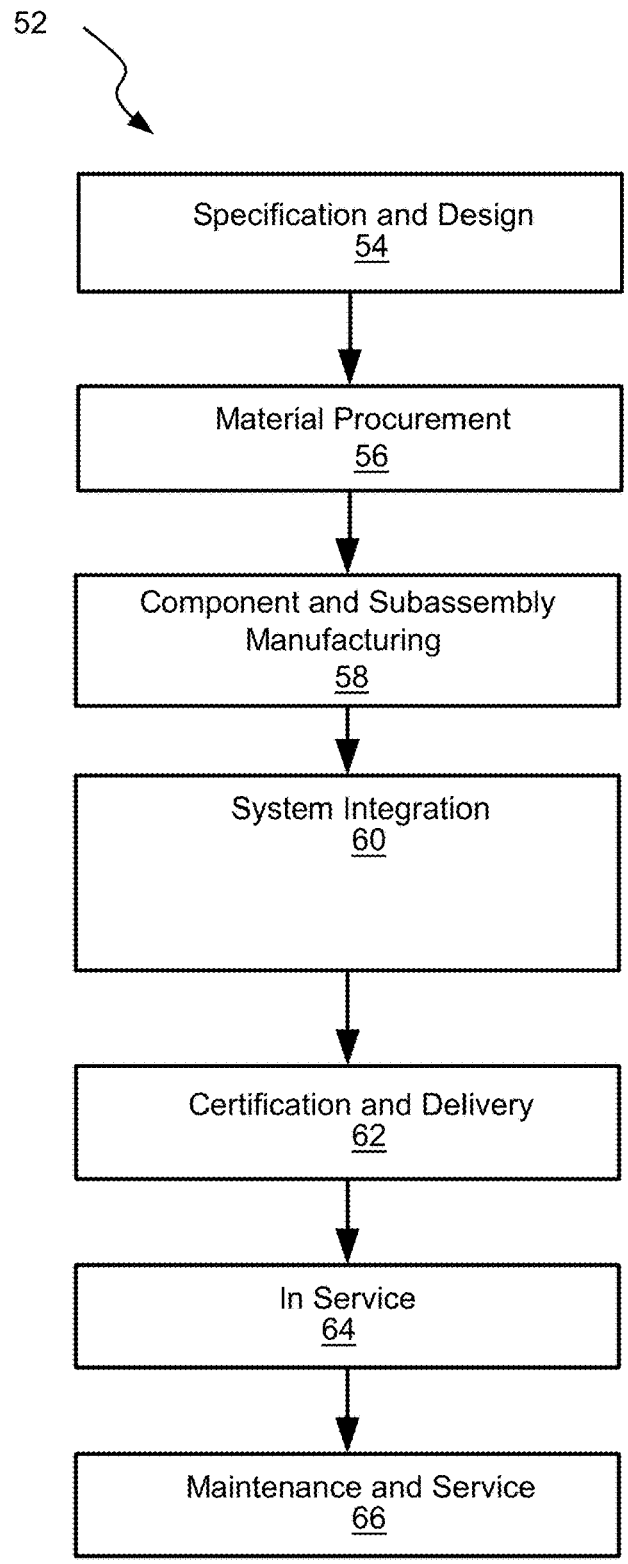
FIG. 6 is a flowchart illustrating an aircraft manufacturing and service method, in accordance with some embodiments.

Examples of the present disclosure may be described in the context of aircraft manufacturing and service method 52 as shown in FIG. 6 and aircraft 38 as shown in FIG. 5. During pre-production, illustrative method 52 may include specification and design (block 54) of aircraft 46 and material procurement (block 56). During production, component and subassembly manufacturing (block 58) and system integration (block 60) of aircraft 38 may take place. In some embodiments, component and subassembly manufacturing (block 58) and system integration (block 60) may occur concurrently. For example, as various components and/or subassemblies complete manufacturing in block 58, they may be integrated into the aircraft 38 at block 60 while other components and/or subassemblies are being manufactured in block 58. Described systems, methods, and assemblies formed by these methods, can be used in any of specification and design (block 54) of aircraft 38, material procurement (block 56), component and subassembly manufacturing (block 58), and/or system integration (block 60) of aircraft 38.

Thereafter, aircraft 38 may go through certification and delivery (block 62) to be placed in service (block 64). While in service (block 64), aircraft 38 may be scheduled for routine maintenance and service (block 66). Routine maintenance and service (block 66) may include modification, reconfiguration, refurbishment, etc. of one or more inspection systems of aircraft 38. Described systems, methods, and assemblies formed by these methods, can be used in any of certification and delivery (block 62), in service (block 64), and/or maintenance and service (block 66).

Each of the processes of illustrative method 52 may be performed or carried out by a system integrator, a third party, and/or an operator (e.g., a customer). For the purposes of this description, a system integrator may include, without limitation, any number of aircraft manufacturers and major system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 52). For example, components or subassemblies corresponding to component and subassembly manufacturing (block 58) may be fabricated or manufactured in a manner similar to components or subassemblies produced while aircraft 38 is in service (block 64). Also, one or more examples of the apparatus(es), method(s), or combination thereof may be utilized during production stages (block 58) and (block 60), for example, by substantially expediting assembly of or reducing the cost of aircraft 38. Similarly, one or more examples of the apparatus or method realizations, or a combination thereof, may be utilized, for example and without limitation, while aircraft 38 is in service (block 64) and/or during maintenance and service (block 66).

Alternatives

The description of the embodiments set forth above has been presented for purposes of illustration and description, and is not intended to be exhaustive or limited to the embodiments described. Many alternatives, modifications and variations may be used in place of the specific elements described above.

The electrical conductors 16 and the electrical insulators 18 primarily provide electrically conducting and insulating enhancements to the composite structure 10. However, the electrical conductors 16 and the electrical insulators 18 could also provide structural enhancements depending on the properties of the electrical conductors 16 and the electrical insulators 18, as well as the composite structure 10.

Metallic particles and alloys other than Cu or Ag with Ti may be used in the electrical conductors 16, and possible non-metallic enhancements (buffers, stabilizers, capping agents, etc.) may be used as well. Moreover, multiple metallic particle alloys may be combined or layered to provide specific enhancements to the final properties of the electrical conductors 16. However, it is expected that particles within the electrical conductors 16 typically cure, sinter, combine or aggregate at temperatures low enough not to damage the composite structure 10, and at temperatures lower than the melting point of the metallic particles.

The electrical conductors 16 may also include formulations containing a small proportion of titanium (Ti) in addition to silver. The titanium can promote adhesion to carbon fibers by converting a thin surface layer of carbon to a titanium carbide (TiC). The highly conducting silver in the electrical conductors 16 will have less affinity for carbon, and so will form a thicker, but adherent, layer on top of the TiC.

Finally, although the description above is directed to aircraft and aerospace vehicles, structures, and applications, this invention is also applicable to other vehicles, structures, and applications. It is intended that the scope of the invention be limited not by this detailed description, but rather by the claims appended hereto.

What is claimed is:

1. A method for fabricating a composite structure with enhanced electrical conduction, comprising:
   forming a laminate stack by assembling one or more composite layers, wherein the composite layers are pre-impregnated with a resin;
   depositing one or more electrical conductors and one or more electrical insulators on at least one of the composite layers prior to curing the laminate stack; and
   curing the laminate stack, including the composite layers, the electrical conductors and the electrical insulators, to create the composite structure;
   wherein the electrical conductors comprise at least one of an electrically conductive ink or an electrically conductive paint; and
   wherein the electrical insulators comprise at least one insulating layer.

2. The method of claim 1, wherein the composite layers are uncured composite layers when the laminate stack is formed.

3. The method of claim 1, further comprising placing one or more additional composite layers on at least one of the electrical conductors prior to the curing of the laminate stack.

4. The method of claim 3, wherein the electrical conductors are interior to the composite structure.

5. The method of claim 1, wherein at least one of the electrical conductors is deposited on at least a portion of a surface layer of the laminate stack.

6. The method of claim 1, wherein both the electrical conductors and the electrical insulators are printed on the composite layers.

7. The method of claim 1, wherein the electrical conductors comprise a circuit trace pattern within or on the composite structure.

8. The method of claim 1, wherein the electrical conductors are deposited on different ones of the composite layers.

9. The method of claim 1, wherein the electrical conductors provide at least one conductive path between the composite layers.

10. The method of claim 1, wherein the electrical conductors have different thicknesses.

11. The method of claim 1, wherein at least one of the electrical conductors is dried prior to the curing of the laminate stack.

12. The method of claim 1, wherein the electrically conductive ink or electrically conductive paint is comprised of a plurality of particles including at least one of copper or silver in a formulation including low temperature sintering agents.

13. The method of claim 12, wherein the particles' size enables sintering at a temperature used to cure the laminate stack.

14. The method of claim 1, wherein one or more of the electrical insulators are deposited in proximity to one or more of the electrical conductors in at least one of the composite layers prior to curing the laminate stack.

15. The method of claim 1, wherein the laminate stack is cured at a temperature between about 100° C. and about 200° C.

16. A composite structure with enhanced electrical conduction, comprising:
(a) a laminate stack comprised of:
(1) one or more composite layers, wherein the composite layers are pre-impregnated with a resin, and
(2) one or more electrical conductors and one or more electrical insulators deposited on at least one of the composite layers, wherein the at least one of the composite layers is an uncured composite layer;
(b) wherein the laminate stack, including the composite layers, the electrical conductors and the electrical insulators, is a cured laminate stack.

17. The composite structure of claim 16, further comprising one or more additional composite layers placed on at least one of the electrical conductors.

18. The composite structure of claim 16, wherein the electrical conductors are interior to the composite structure.

19. The composite structure of claim 16, wherein at least one of the electrical conductors is deposited on at least a portion of a surface layer of the laminate stack.

20. The composite structure of claim 16, wherein the electrical conductors comprise one or more conductive layers deposited on the composite layers.

21. The composite structure of claim 16, wherein the electrical conductors comprise a circuit trace pattern within or on the composite structure.

22. The composite structure of claim 16, wherein the electrical conductors are deposited on different ones of the composite layers.

23. The composite structure of claim 16, wherein the electrical conductors provide at least one conductive path between the composite layers.

24. The composite structure of claim 16, wherein the electrical conductors have different thicknesses.

25. The composite structure of claim 16, wherein the electrical conductors comprise at least one of an electrically conductive ink or electrically conductive paint and the electrically conductive ink or electrically conductive paint is comprised of a plurality of particles including at least one of copper or silver in a formulation including low temperature sintering agents.

26. The composite structure of claim 25, wherein the particles' size enables sintering at a temperature used to cure the laminate stack.

27. The composite structure of claim 16, wherein one or more of the electrical insulators are deposited in proximity to one or more of the electrical conductors in at least one of the composite layers.

28. An aircraft with enhanced electrical conduction, comprising:
a composite structure comprised of:
(a) a laminate stack comprised of:
(1) one or more composite layers, wherein the composite layers are pre-impregnated with a resin, and
(2) one or more electrical conductors and one or more electrical insulators deposited on at least one of the composite layers, wherein the at least one of the composite layers is an uncured composite layer pre-impregnated with the resin;
(b) wherein the laminate stack, including the composite layers, the electrical conductors and the electrical insulators, is a cured laminate stack.

29. The aircraft structure of claim 28, wherein the composite structure is comprised of composite materials formed from carbon fiber-reinforced polymers (CFRPs), and the electrical conductors form part of a lightning protection system, an electromagnetic effects (EME) management system, or a grounding system.

30. The aircraft structure of claim 28, further comprising one or more additional composite layers placed on at least one of the electrical conductors.

31. The aircraft structure of claim 30, wherein the electrical conductors are interior to the composite structure.

32. The aircraft structure of claim 28, wherein at least one of the electrical conductors is deposited on at least a portion of a surface layer of the laminate stack.

33. The aircraft structure of claim 28, wherein the electrical conductors comprise one or more conductive layers deposited on the composite layers.

34. The aircraft structure of claim 28, wherein the electrical conductors comprise a circuit trace pattern within or on the composite structure.

35. The aircraft structure of claim 28, wherein the electrical conductors are deposited on different ones of the composite layers.

36. The aircraft structure of claim 28, wherein the electrical conductors provide at least one conductive path between the composite layers.

37. The aircraft structure of claim 28, wherein the electrical conductors have different thicknesses.

38. The aircraft structure of claim 28, wherein the electrical conductors comprise at least one of an electrically conductive ink or electrically conductive paint and the electrically conductive ink or electrically conductive paint is comprised of a plurality of particles including at least one of copper or silver in a formulation including low temperature sintering agents.

39. The aircraft structure of claim 38, wherein the particles' size enables sintering at a temperature used to cure the laminate stack.

40. The aircraft structure of claim 28, wherein one or more of the electrical insulators are deposited in proximity to one or more of the electrical conductors in at least one of the composite layers.

* * * * *